(12) United States Patent
Hadjieleftheriou et al.

(10) Patent No.: US 7,921,100 B2
(45) Date of Patent: Apr. 5, 2011

(54) SET SIMILARITY SELECTION QUERIES AT INTERACTIVE SPEEDS

(75) Inventors: Marios Hadjieleftheriou, Madison, NJ (US); Amit Chandel, Noida (IN); Nick Koudas, Toronto (CA); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 467 days.

(21) Appl. No.: 12/006,332

(22) Filed: Jan. 2, 2008

(65) Prior Publication Data

US 2009/0171944 A1    Jul. 2, 2009

(51) Int. Cl.
*G06F 17/30* (2006.01)

(52) U.S. Cl. .................................. 707/713; 707/728

(58) Field of Classification Search .............. 707/5, 713, 707/728
See application file for complete search history.

(56) References Cited

U.S. PATENT DOCUMENTS

| | | |
|---|---|---|
| 7,139,756 B2 | 11/2006 | Cooper et al. |
| 7,152,065 B2 | 12/2006 | Behrens et al. |
| 7,219,089 B2 | 5/2007 | Kobayashi et al. |
| 7,283,999 B1 | 10/2007 | Ramesh et al. |
| 2005/0021517 A1 * | 1/2005 | Marchisio .......................... 707/4 |
| 2006/0190425 A1 * | 8/2006 | Chang et al. ....................... 707/2 |
| 2007/0067361 A1 * | 3/2007 | Bailey et al. ................... 707/204 |
| 2007/0185871 A1 | 8/2007 | Canright et al. |
| 2007/0239705 A1 | 10/2007 | Hunt et al. |
| 2008/0294651 A1 * | 11/2008 | Masuyama et al. ........... 707/100 |

OTHER PUBLICATIONS

R. Fagin, et al., "Optimal Aggregation Algorithms for Middleware". J. Computer and System Sciences 66 (2003), pp. 614-656.
S. Robertson. "Understanding Inverse Document Frequency: On Theoretical Arguments for IDF". J. Documentation 60 (5), pp. 503-520, (2004).
H. Bast, et al., "IO-Top-k: Index-access Optimized Top-k Query Processing". VLDB '06. Seoul, Korea. pp. 475-486 (2006).

* cited by examiner

*Primary Examiner* — Jean B. Fleurantin
*Assistant Examiner* — Dennis Myint

(57) ABSTRACT

The similarity between a query set comprising query set tokens and a database set comprising database set tokens is determined by a similarity score. The database sets belong to a data collection set, which contains all database sets from which information may be retrieved. If the similarity score is greater than or equal to a user-defined threshold, the database set has information relevant to the query set. The similarity score is calculated with an inverse document frequency method (IDF) similarity measure independent of term frequency. The document frequency is based at least in part on the number of database sets in the data collection set and the number of database sets which contain at least one query set token. The length of the query set and the length of the database set are normalized.

23 Claims, 7 Drawing Sheets

FIG. 4

(L402) Input: Lists $q = \{q^1, ..., q^n\}$, Threshold $\tau$ (L404) Output: Sets with $I(q,s) \geq \tau$ (L406) Set $C = \emptyset$, $f_i$ = first element in list $i$ (L408) $\forall$ new $s \in C$, let $I^+(s) = 0$, $I^-(s) = 0$, $b_{[1,n]}(s) = 0$ (L410) repeat

(L412)     for all $1 \leq i \leq n$ do

(L414)         $f_i = s$ = populate next element from list $i$ (L416)         If $s \notin C$, insert $s$ in $C$ (L418)         Else retrieve $s$ from $C$ (L420)         $I^+(s) += w_i(s)$, $b_i = 1$ (L422)     for all $r \in C$ do

(L424)         Update $b_i(r)$ according to new $f_i$ (L426)         If $b_{[1,n]}(r) = 1$ and $I(q,s) \geq \tau$ report $r$ (L428)         If new $I^-(r) < \tau$ remove $r$ from $C$ (L430) until $C = \emptyset$

FIG. 5

| | |
|---|---|
| (L502) | Input: Lists $q = \{q^1, ..., q^n\}$, Threshold $\tau$ |
| (L504) | Output: Sets with $I(q,s) \geq \tau$ |
| (L506) | Set $C = \emptyset$, $f_i$ = first element in list $i$ |
| (L508) | $\forall$ new $s \in C$, let $I^+(s) = 0$, $I^{\dashv}(s) = 0$, $b_{[1,n]}(s) = 0$ |
| (L510) | Skip to first entry with $len(s) > \tau len(q)$ in all lists |
| (L512) | repeat |
| (L514) |     for all $1 \leq i \leq n$ do |
| (L516) |         $f_i = s$ = populate next element from list $i$ |
| (L518) |         If $len(s) > len(q) / \tau$, mark list as complete |
| (L519) |         If $len(s) > \max len(C)$ mark list as complete |
| (L520) |         If $s \notin C$ and $\mathcal{F} < \tau$ or $\sum_{1 \leq j \leq n} w_j(s) < \tau$ continue |
| (L522) |         Else insert $s$ in $C$ or retrieve $s$ from $C$ |
| (L524) |         $I^+(s) + = w_i(s)$, $b_i = 1$ |
| (L526) |     If $\mathcal{F} < \tau$ then for all $r \in C$ do |
| (L528) |         Update $b_i(r)$ according to new $f_i$ |
| (L530) |         If $b_{[1,n]}(r) = 1$ and $I(q,s) \geq \tau$ report $r$ |
| (L532) |         If new $I^{\dashv}(r) < \tau$ remove $r$ from $C$ |
| (L534) |         Else break |
| (L536) | until $C = \emptyset$ |

FIG. 6

(L602) Input: Lists $q = \{q^1, ..., q^n\}$, Threshold $\tau$ (L604) Output: Sets with $I(q,s) \geq \tau$ (L606) Let $idf(q^1) > idf(q^2) > ..., idf(q^n)$ (L608) Set $C = \emptyset$, $\max len(C) = 0$ (L610) for all $1 \leq i \leq n$ do

(L612) Skip to first entry with $len(s) \geq \tau len(q)$ (L614) Compute $\lambda_i$ using Equation $\sum_{i \leq j \leq n} \frac{idf(q^j)^2}{\lambda_i len(q)} = \tau \Rightarrow \lambda_i = \sum_{i \leq j \leq n} \frac{idf(q^j)^2}{\tau len(q)}$ (L616) Let $\mu_i = \min(\lambda_i, len(q)/\tau)$ (L618) repeat $len(s) > \max(\max len(C), \mu_i)$ (L620) $s$ = populate next element from list $i$ (L622) If $s \in C$, $I^+(s) += w_i(s)$ (L624) Else if $len(s) \leq \lambda_i$, insert $s$ in $C$ (L626) $\forall$ skipped $r \in C$ reevaluate $I^+(r)$ and discard (L628) until $len(s) > \max(\max len(C), \mu_i)$ ic" may yield records principally irrelevant to a query for "automobile", with the exception of records pertaining to "automatic transmission".

One key process used in information retrieval is set similarity selection, which determines when two sets of terms are similar enough to be of interest, either for data cleaning, information retrieval, or other user-defined applications. Various set similarity methods have been developed. In many instances, however, they are inefficient and slow. What are needed are method and apparatus for set similarity selection which are efficient, fast, and accurate.

SET SIMILARITY SELECTION QUERIES AT INTERACTIVE SPEEDS

BACKGROUND OF THE INVENTION

The present invention relates generally to information retrieval, and more particularly to set similarity selection queries.

Due to the widespread popularity of the global Internet, information retrieval from databases has become a familiar practice for many users. Users search the global Internet for a wide range of information, from telephone numbers to automobile ratings to esoteric scientific data. In a search, a user issues a query (request for information) to a database containing stored information of interest. An information retrieval system then retrieves information relevant to the query. As a simple scenario, consider a user who wishes to find the telephone number of a specific person. The user issues a query, which contains the name of a specific person as input, to an information retrieval system. The information retrieval system then searches an electronic phonebook containing records matching people's names with their corresponding phone numbers. If the search is successful, the phone number of the specific person is retrieved and returned as output to the user.

In general, information retrieval is a complex process, due to both the nature of the query and the nature of the stored information. In many instances, a query may not fully define the information of interest. For example, in many instances, a query contains only a few keywords. The information may be stored in multiple records stored in multiple databases (consider the vast number of websites on the global Internet, for example). A principal function of an information retrieval system is to search through the databases and return only those records which are highly relevant to the query. It is desirable for an information retrieval system to be efficient (for example, to reduce required computer resources such as processor usage and memory) and to be fast (for example, to support near-real-time interactive sessions with a user). It is also desirable for an information retrieval system to have high accuracy (that is, to not miss relevant records and to not retrieve irrelevant records).

One issue which arises in information retrieval systems is the treatment of data inconsistencies. The causes of data inconsistencies may range from trivial (for example, typographical errors) to complex (for example, incompatible database formats). Data inconsistencies impact both the quality of the data stored in the databases and the effectiveness of information retrieval. Correcting errors in the databases is referred to as data cleaning. For example, there may be similar entries in a database which are actually duplicates of the same entry (but one has been mis-spelled, or entered in a different format, for example). Removing duplicates is an example of a data cleaning process. The data cleaning process, however, needs to minimize the probability of removing an entry which is similar to, but actually distinct from, another entry. Data cleaning may also be applied to the query as well.

Accommodating data inconsistencies in queries, on the other hand, is important for efficient retrieval of records which have a high probability of being relevant to a user query. Requiring an exact match between a term in a query and a term in the database may cause relevant information to be rejected. For example, a record pertaining to "automobile" (mis-spelled entry) may have a high probability of being relevant to a query for "automobile". Too loose a match, however, may result in an excessive number of irrelevant records being retrieved. For a example, a reference to "auto-

BRIEF SUMMARY OF THE INVENTION

The similarity between a query set comprising query set tokens and a database set comprising database set tokens is determined by a similarity score. The database sets belong to a data collection set, which contains all database sets from which information may be retrieved. If the similarity score is greater than or equal to a user-defined threshold, the database set has information relevant to the query set. The similarity score is calculated with an inverse document frequency method (IDF) similarity measure independent of term frequency. The document frequency is based at least in part on the number of database sets in the data collection set and the number of database sets which contain at least one query set token. The length of the query set and the length of the database set are normalized.

These and other advantages of the invention will be apparent to those of ordinary skill in the art by reference to the following detailed description and the accompanying drawings.

BRIEF DESCRIPTION OF THE DRAWINGS

FIG. 4 shows pseudocode for an NRA method;

FIG. 5 shows pseudocode for an iNRA method and a hybrid method;

FIG. 6 shows pseudocode for a shortest-first method; and,

DETAILED DESCRIPTION

Figure 1:
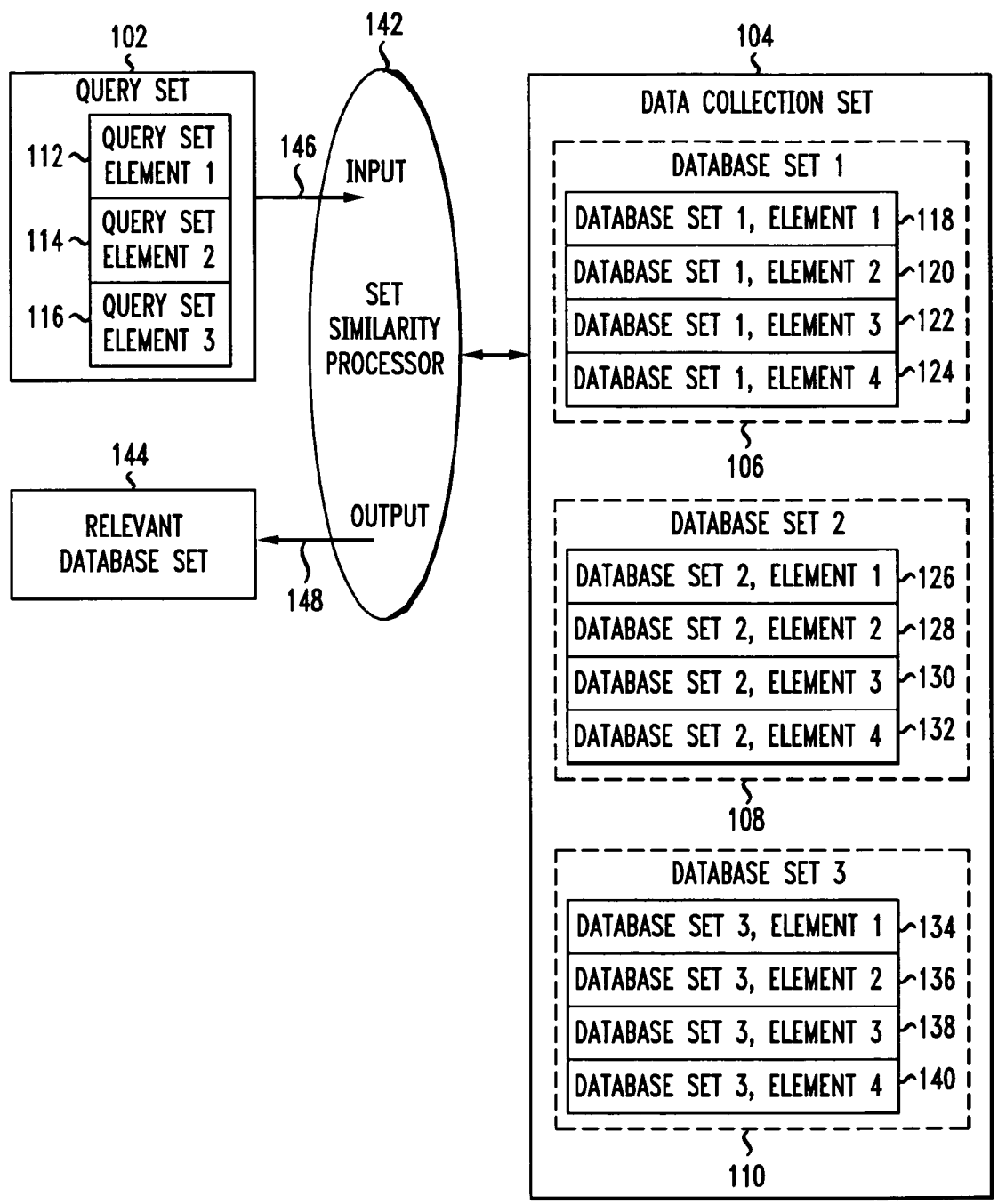
FIG. 1 shows a high-level schematic of an information retrieval system.

A high-level schematic of a generalized information retrieval system is shown in FIG. 1. The system includes three major subsystems, data collection set 104, query set 102, and set similarity processor 142. Data collection set 104 represents the entire set of data from which information may be retrieved. Data collection set 104 is decomposed into database set 1 106-database set 3 110. Herein, a database set is a user-defined subset of a data collection set. Individual database sets are retrieved from a data collection set in response to a query (see below). Each database set is further decomposed into elements. Database set 1 106 is decomposed into database set 1, element 1 118-database set 1, element 4 124. Database set 2 108 is decomposed into database set 2, element 1 126-database set 2, element 4 132. Database set 3 110 is decomposed into database set 3, element 1 134-database set 3, element 4 140. As one example, database set 1 106-database set 3 110 represent individual documents in a library, represented by data collection set 104. As another example, database set 1 106-database set 3 110 represent individual websites in the global Internet, represented by data collection set 104.

Query set 102, which is decomposed into query set element 1 112-query set element 3 116, specifies relevant information which a user wishes to retrieve. Herein, a query set is a user-defined set of elements of interest (for example, keywords). Query set 102 is provided as input 146 to set similarity processor 142, which searches data collection set 104 for database sets which are similar (see below) to query set 102. If set similarity processor 142 determines that a database set is sufficiently similar to query set 102, it marks the database set as containing information relevant to query set 102. Set similarity processor 142 then provides as output 148 relevant database set 144, which may be one or more of database set 1 106-database set 3 110. In some instances, there may be no database set relevant to a query.

Herein, a token is a user-defined element of a set, such as query set 102 or data collection set 104, used for a set similarity selection query (see below). A token, for example, may be a keyword ('university'), a group of keywords ('University of Illinois'), or a string ('eywo'). Herein, a token multi-set is a set in which a token may appear more than once. If the available tokens are the words 'red', 'orange', 'yellow', 'green', 'blue', 'indigo', and 'violet', then examples of token multi-sets are {'red', 'yellow', 'red'} and {'orange', 'green', 'blue', 'green', 'blue'}. If the tokens carry equal weight, the similarity of two token multi-sets is principally a function of the number of tokens they have in common. For example, the token multi-sets {'red', 'red', 'yellow', 'green', 'indigo'} and {'yellow', 'orange', 'orange', 'blue', 'violet'} have only the single token 'yellow' in common, and, according to some user-defined criteria, may have low similarity. The token multi-sets {'red', 'orange', 'yellow', 'green'} and {'red', 'orange', 'yellow', 'blue'}, on the other hand, have three tokens in common, and, according to some user-defined criteria, may have high similarity.

In general, however, tokens do not have equal weight when determining similarity, because some tokens naturally occur frequently in a data collection set. For example, consider a library which includes a set of documents. A query is issued to retrieve documents which contain information relevant to 'indium'. If the query set is {'a', 'the', 'of', 'and', 'but', 'indium', 'phosphide'}, then the query set may show a high similarity with a large number of documents simply because five of the seven tokens {'a', 'the', 'of', 'and', 'but'} naturally occur frequently in any document. These documents, however, may not contain information relevant to a query about 'indium'. One technique for addressing this issue is to give a lower weight to words which naturally appear frequently.

In general, a similarity measure is a process which indicates how similar one dataset is to another dataset. A value determined by a similarity measure is referred to herein as a similarity score. If the similarity score of a query set and a database set is greater than or equal to a user-defined threshold value (referred to herein as threshold $\tau$), then the database set contains information with a high probability of being relevant to the query set. To simplify the discussion herein, a database set containing information with a high probability of being relevant to a query set is referred to as a database set containing information relevant to the query set. It is also referred to as a relevant database set. One well-known similarity measure is calculated from the Term Frequency-Inverse Document Frequency (TF-IDF) method. In an example in which the data collection set is a set of documents, term frequency is the number of times a specific term (for example, a search term such as a keyword) appears in a particular document. The document frequency is the number of documents in which the specific term appears at least once. Inverse document frequency is 1/(document frequency). The TF-IDF method operates on the premise that the probability that a document contains information relevant to a query increases if the number of appearances of a term (specified in the query set) in a document increases. A further premise is that the probability that a document contains information relevant to a query decreases if the number of documents containing the term increases (since the query term may then be a frequently appearing generic term).

Herein, the term frequency (tf) of a token is the total number of times that the token appears in a token multi-set (which may be a query set or a database set). Herein, the inverse document frequency (idf) of a token is a function of the inverse of (the number of database sets that a token appears in)/(the total number of database sets in the data collection set). A specific example of an idf function is given below in (E1). Analysis of real-world databases by the inventors indicates that, for many applications, dropping the tf component has a negligible impact on the average precision (ratio of relevant database sets retrieved/total number of database sets retrieved). Dropping the tf component is equivalent to fixing the tf component at the value of 1. Multi-sets are thereby reduced to sets. The modified similarity measure is referred to herein as IDF. As discussed below, IDF has advantageous properties, relative to prior-art TF-IDF, which may result in more efficient and faster methods for calculating similarity scores. More details of IDF similarity scores are discussed below.

Efficiency and speed may also be improved by length normalization (see below), which normalizes the similarity scores to the range [0,1]. Since similar sets are expected to have similar lengths, the search space may be pruned based on set lengths alone. Also, without length normalization, similarity thresholds need to be expressed in terms of unbounded constants. With length normalization, an exact match always has a similarity score equal to 1. More details of length normalization are discussed below.

Set similarity is first discussed in the context of generalized sets. Discussion with respect to the example in FIG. 1 then follows. Consider a data collection set $\mathcal{D}$ of sets (for example, a set of strings where each string has been decomposed into q-grams, words, or other elements), where every set is composed of a number of elements from universe $\mathcal{U}$. Let set $s = \{s^1, \ldots, s^n\}, s^i \in \mathcal{U}$, where $s^i$ is a token. Every $s^i$ is assigned an idf weight computed as follows. Let $N(s^i)$ be the total number of sets containing token $s^i$, and N be the total number of sets in the data collection set. Then, $$idf(s^i) = \log_2(1 + N/N(s^i)) \tag{E1}$$

Note that idf( ) is a function $\mathrm{idf}: \mathcal{U} \to \mathbb{R}$. That is, the domain is the set of tokens $\mathcal{U}$ and the image is the real numbers.

The normalized length of set s is computed as $$len(s) = \sqrt{\sum_{s^i \in s} idf(s^i)^2} \tag{E2}$$

Note that len( ) is a function $\mathrm{len}: S \to \mathbb{R}$. That is, the domain is the set S of all sets of tokens s.

The normalized length of query set is computed as $$len(q) = \sqrt{\sum_{q^i \in q} idf(q^i)^2} \qquad (E3)$$

In (E3), $idf(q^i)$ is equal to $idf(q^i)$ in the database set. If $q^i$ does not appear in the database set, then $idf(q^i)=0$.
The IDF similarity score of sets q and s is:

$$\mathcal{I}(q, s) = \sum_{s^i \in q \cap s} \frac{idf(s^i)^2}{len(s) len(q)} \qquad (E4)$$

As the number of common tokens increases, the IDF similarity score increases. If q=s, the IDF similarity score is equal to 1. The contribution of every common token to the IDF similarity score, however, is dampened as the length divergence between the two sets increases. Denote with $w_i(s)$ the contribution of $s^i$ to the overall score:

$$\mathcal{I}(q, s) = \sum_{s^i \in q \cap s} w_i(s) \qquad (E5)$$

If $s^i \notin s$, then $w_i(s)=0$. If $s^i \in s$, then $$w_i(s) = idf(s^i)^2 / len(s) len(q) \qquad (E6)$$

Figure 2:
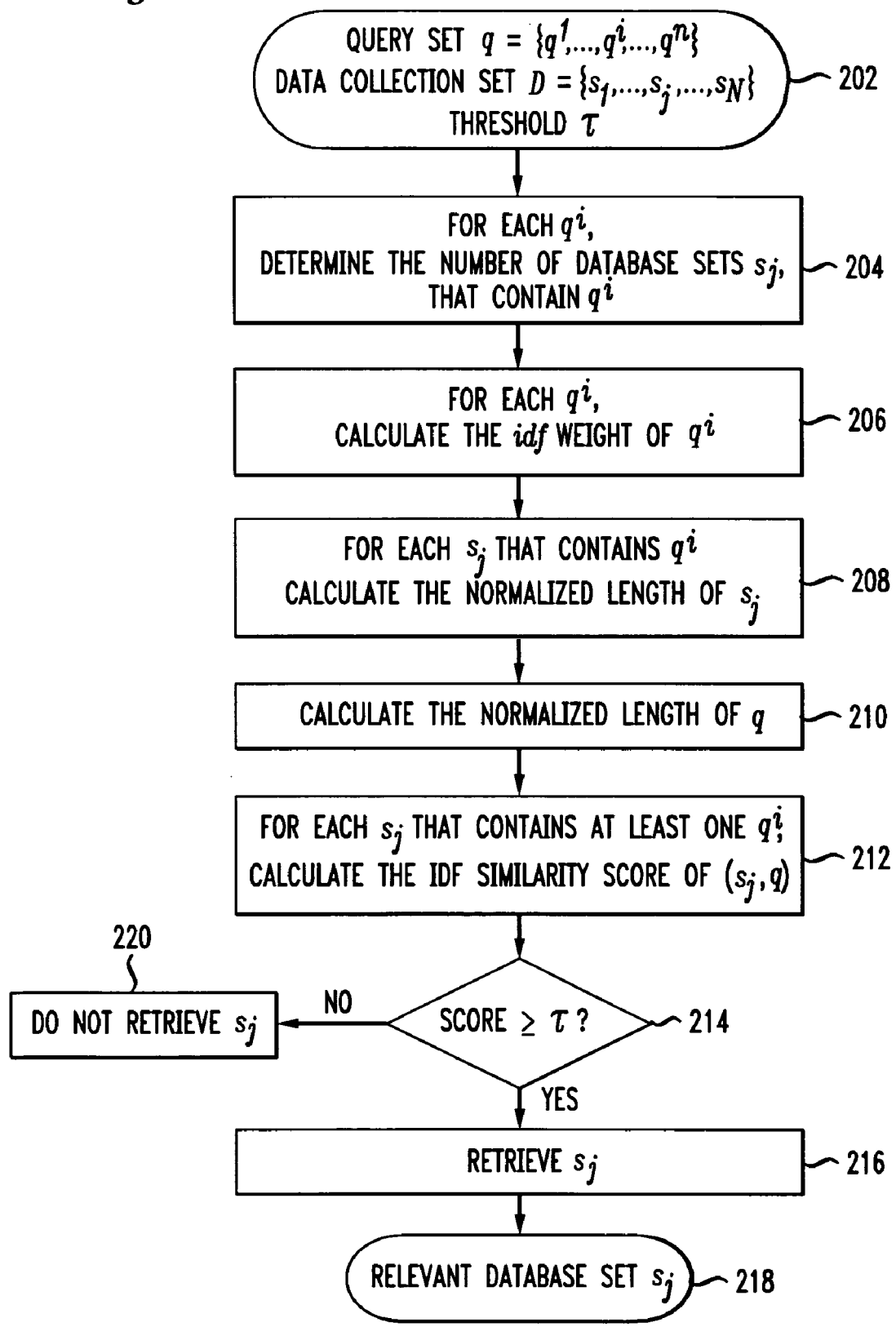
FIG. 2 shows a high-level flowchart for steps in an IDF set similarity selection query.

FIG. 2 shows a flowchart of steps in a method for set similarity selection using IDF. In step 202, the following input is provided:
Query set $q=\{q^1, \ldots, q^i, \ldots, q^n\}$, n=total number of tokens in q
Data collection set $\mathcal{D} = \{s_1, \ldots, s_j, \ldots s_N\}$, N=total number of database sets in $\mathcal{D}$
Threshold τ
In step 204, for each token $q^i$, the number of database sets $s_j$ that contain the token $q^i$ is determined. Denote this number by $N(q^i)$. The process then passes to step 206, in which the idf weight of each token $q^i$ is calculated according to (E1):

$$idf(q^i) = \log_2(1 + N/N(q^i))$$

The process then passes to step 208, in which the normalized length of each database set $s_j$ that contains the token $q^i$ is calculated according to (E2):

$$len(s_j) = \sqrt{\sum_{s^i_j \in s_j} idf(s^i_j)^2}$$

The process then passes to step 210, in which the normalized length of q is calculated according to (E3). The process then passes to step 212. For each $s_j$ that contains at least one $q^i$, the IDF similarity score of $(s_j, q)$ is calculated according to (E4).

$$\mathcal{I}(q, s_j) = \sum_{s^i_j \in q \cap s_j} \frac{idf(s^i_j)^2}{len(s_j) len(q)}$$

The process then passes to step 214, in which the IDF similarity score of $(s_j, q)$ is compared to threshold τ. If the IDF similarity score is greater than or equal to τ, then the process passes to step 216, in which $s_j$ is retrieved. The relevant database set $s_j$ is then provided as output 218 to the user. Returning to step 214, if the IDF similarity score is less than τ, then the process passes to step 220. Since the database set $s_j$ is not relevant, it is not retrieved.

With respect to the example shown in FIG. 1, data collection set $\mathcal{D}$ of sets corresponds to data collection set 104. Set $s_j$ corresponds to any one of database set 1 106-database set 3 110. A token $s_j^i$ corresponds to an element in a database set. For $s_j$=database set 1 106, for example, $\{s_j^1, \ldots, s_j^n\}$={database set 1, element 1 118; database set 1, element 2 120; database set 1, element 3 122; database set 1, element 4 124}. Universe $\mathcal{U}$, not shown in FIG. 1, corresponds to all possible elements. For example, if data collection set 104 corresponds to a library, and an element is an English word, then universe $\mathcal{U}$ corresponds to all words in the English language. The number N corresponds to the number of database sets in data collection set 104. In the example shown in FIG. 1, N=3. The number $N(s_j^i)$ corresponds to the number of database sets in which a specific token $s_j^i$ appears. For example, let data collection set 104 correspond to a library, database set 1 106-database set 3 110 correspond to individual documents, and $s_j^i$ correspond to the word 'indium'. Then $N(s_j^i)$ is the total number of documents that contain the word 'indium'. In this example, the range of $N(s_j^i)$ runs from 0 ('indium' does not appear in any document) to 3 ('indium' appears in all three documents). The set q corresponds to query set 102. A token $q^i$ in query set 102 corresponds to any one of query set element 1 112-query set element 3 116.

Embodiments of the invention calculate the IDF similarity score of a given query set with every individual database set in a data collection set, and report the database sets whose IDF similarity score is greater than or equal to a user-defined threshold τ. An embodiment may use specialized indices based either on relational database technology or on inverted lists. Using relational algebra, the IDF similarity measure may be calculated using pure relational algebra by methods similar to those used for calculating TF-IDF similarity measures. In these methods, a data collection set $\mathcal{D}$ is first pre-processed, and the database sets s are stored in a relational table in a First Normal Form, referred to herein as a base table. Every row of the base table includes a set id (identifier), a token, the token idf, and the normalized length len of the set. Given a query set q, the same pre-processing as for the database sets is performed, and the result is stored as a separate query table. Evaluating the IDF similarity measure between the sets in the base table and the set in the query table may be performed using standard Structured Query Language (SQL) processing in the form of an aggregate/group-by/join statement. If an index on tokens is available, processing may be very fast, since sets that do not contain any query tokens may immediately be pruned out. A clustered index is advantageous. If an index is not available, a linear-scan of the base table may be used.

In another embodiment, a structured list, such as list with a specialized index, may be designed. For example, an inverted index on the tokens in $\mathcal{U}$ is generated. One list per token $s^i$ is generated. The list is composed of one pair $(s, len(s))$ per set containing $s^i$. Denote the query set by $q = \{q^1, \ldots, q^n\}$ and the length by $len(q)$. Using an inverted index, $\mathcal{I}(q, s)$ may be computed for all s by scanning/the lists of tokens $q^i$, $1 \le i \le n$ in one pass. Irrelevant sets (with $s \cap q = \emptyset$) are never accessed. To simplify the notation herein, every set is associated with a unique natural number as its set id. In one embodiment, lists are sorted in increasing order of set id.

Figure 3:
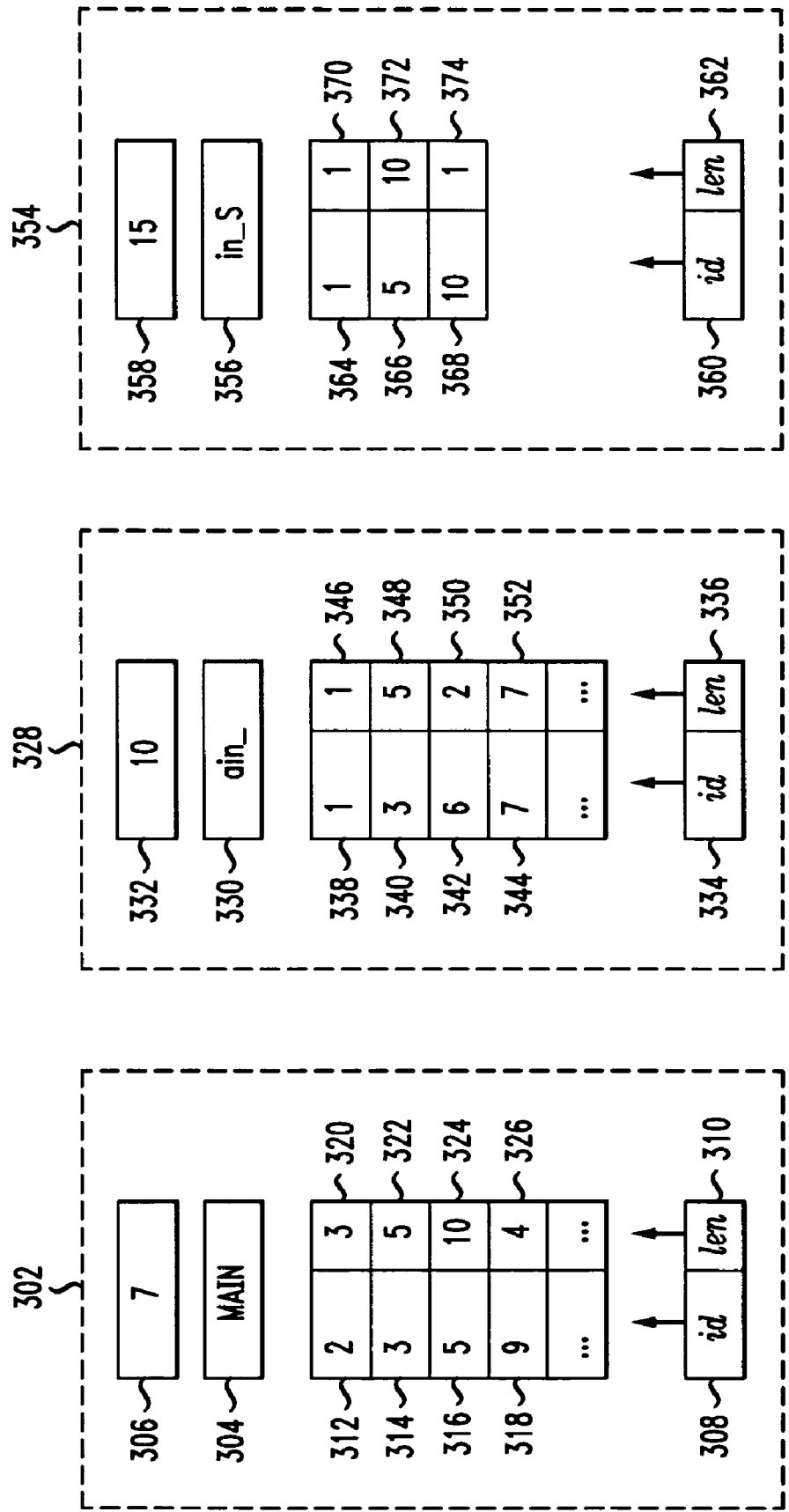
FIG. 3 shows a high-level schematic of a list structure.

An example of structured lists is shown in FIG. 3. The query is 'Main Street'. The tokens are 4-grams, strings of 4 consecutive characters (a space is considered a character and is indicated by an underscore _). The available set of tokens in $\mathcal{U}$ are 'Main', 'ain_', 'in_S', 'n_St', ..., 'reet'. FIG. 3 shows structured lists for the first three 4-grams. For structured list 302, the 4-gram 304 is 'Main'. Column 308 lists the set id's, id 312-id 318. Column 310 lists the corresponding set lengths len, len 320-len 326. Only the first four entries are shown. The idf value 306 is 7. For structured list 328, the 4-gram 330 is 'ain_'. Column 334 lists the set id's, id 338-id 344. Column 336 lists the corresponding set lengths len, len 346-len 352. Only the first four entries are shown. The idf value 332 is 10. For structured list 354, the 4-gram 356 is 'in_S'. Column 360 lists the set id's, id 364-id 368. Column 362 lists the corresponding set lengths len, len 370-len 374. In this example, structured list 354 contains only three entries. The idf value 358 is 10. Similar structured lists are constructed for the remaining 4-grams.

Computing $\mathcal{I}(q, s)$ for all s may be performed using a multi-way list merging method. A heap containing the set id's at the head of the lists is maintained in memory. In the example shown in FIG. 3, the corresponding set id's are id 312=2 for structured list 302; id 338=1 for structured list 328; id 364=1 for structured list 354. The IDF similarity score of any id that appears at the head of multiple lists is aggregated. The IDF similarity score of the smallest id (the one at the top of the heap) is complete. That is, this id has either been encountered in all lists or does not appear in the rest of the lists. If its IDF similarity score is greater than or equal to τ, it is reported as an answer; else it is discarded. The process is repeated after advancing the head of the lists pointing to the id last removed from the heap.

In another embodiment, the lists are sorted first in increasing order of lengths and then in increasing order of set id's. The len(q) is constant across all lists, and for a given token $q^i$, idf($q^i$) is constant across list i. By sorting the list in increasing length order of sets, the sets are arranged in decreasing $w_i$ order. Given that IDF similarity measure is a monotonic score function, methods similar to those used for Threshold Algorithm-No Random Access (TA-NRA) methods may be used to compute the IDF similarity scores incrementally, by using (E1).

For simplicity in the following examples, the lists appear already in sorted $w_i$ order, where the token idf, the length of the set, and the length of the query have already been taken into account. One embodiment for calculating set similarity scores using IDF is referred to herein as the NRA method, which performs sequential accesses only. High-level pseudocode for the NRA method is shown in FIG. 4. Given FIG. 4 and the accompanying description herein, one skilled in the art would be able to implement the method shown in FIG. 4. For example, one skilled in the art would be able to implement the method using appropriate computer program instructions. In FIG. 4, (L402)-(L430) refer to line numbers in the pseudocode. The same convention with respect to line numbers is also used in FIG. 5 and FIG. 6. In (L402), the lists $q=\{q^1, \ldots, q^n\}$ and the threshold τ are provided as input. The desired output, shown in (L404), are the sets s whose IDF similarity score $\mathcal{I}(q, s)$ is ≧τ. In (L406), the candidate list C is initially set to null, C=∅, and $f_i$ is initialized to the first element in list i. In (L408), the following initial values are set: ∀ new s∈C, let $\mathcal{I}^+(s)$=0; $\mathcal{I}^+(s)$=0; $b_{[1,n]}(s)$=0. Here, $\mathcal{I}^+(s)$ is the lower bound of the IDF similarity score; $\mathcal{I}^+(s)$ is the upper bound of the IDF similarity score; $b_{[1,n]}(s)$ is a bit vector indicating the lists in which s has not been encountered yet. In (L410), the pseudocode instructs the steps shown in (L412)-(L428) to be repeated until the stopping condition in (L430) is reached. In (L412) the pseudocode instructs the steps shown in (L414)-(L420) to be iterated for all 1≦i≦n. The lists are read in a round-robin fashion, and the next element from every list is iteratively loaded, starting from the top. A hash table with one entry per set id discovered so far is maintained in memory. Each entry s contains the aggregated score of the contributions of the lists in which s has already appeared. It also contains a bit vector indicating the lists in which s has not been encountered yet. Denote the last (frontier) element read on each list by $f_i$, 1≦i≦n. The lower bound $\mathcal{I}^+(s)$ of the IDF similarity score of s is computed as the sum of $w_i(s)$ for all i in which s has been encountered so far. After the lower bound $\mathcal{I}^+(s)$ has been established, then in (L422), the pseudocode instructs the steps shown in (L424)-(L428) to be iterated for all r∈C. The upper bound $\mathcal{I}^+(s)$ is computed as the sum of the lower bound and the contributions $w_i(f_i)$ for each i in which s has not been encountered yet. On every iteration over the lists, after all $f_i$ have been updated, the NRA method scans the candidate set and discards all s with upper bound smaller than τ. It also reports sets whose IDF similarity score is complete and greater than or equal to τ. The search terminates when the candidate set becomes empty, C=∅ (L430). If an index on set id's is also available per inverted list, a TA process may be used to perform the search.

In addition to monotonicity, IDF has additional properties which make it advantageous over TF-IDF. These properties, discussed below, may be used to develop more efficient and faster methods for calculating similarity measure. As previously discussed, list entries are sorted in increasing order of lengths (and, consequently, in decreasing order of contributions $w_i$). The length of a set is constant across all lists. If two sets s and r appear in multiple lists, their sort order is preserved. This property is referred to herein as order preservation. This property may be expressed by the following relationship: For all k≠l, if $w_k(s)≦w_k(r)$, then $w_l(s)≦w_l(r)$ and vice versa. Embodiments may use the order preservation property in an advantageous manner. If from list k it is known that len(s)<len(r) and set r has already been encountered in any other list l, then either set s has been encountered in l as well, or s does not appear in l.

After the length of a set is known (for example, after encountering the set in list k), the contribution $w_k$ may be computed, and all other contributions $w_l$, l≠k (since the idf's of all tokens are known) may be computed. After encountering a set s in any list k, a best case maximum score for s may be determined by making the assumption that s appears in all other lists. This property is referred to herein as magnitude boundedness. This property may be expressed by the following relationship: For any s and q) after retrieving len(s) from any list k, a best case upper bound $\mathcal{I}^+(s)$ may be computed directly. This gives a tight upper bound that may be used for more efficient pruning.

Similar sets are expected to have similar lengths. Also, since small sets tend to have small lengths, and large sets tend to have large lengths, pruning may be performed based on set lengths: Given query q, set s, and threshold τ, then $$\mathcal{I}(q, s) \geq \tau \text{ iff } \tau len(q) \leq len(s) \leq \frac{len(q)}{\tau} \qquad (E7)$$

This result is referred to as length boundedness. Given the inverted lists of the query tokens and a user-defined threshold, all sets whose lengths fall outside the given bounds may be immediately pruned. Any method for determining a similarity measure may then be performed on a much reduced subset of the database, thereby improving performance.

The properties of IDF discussed above (order preservation, magnitude boundedness, and length boundedness) may be used to improve the NRA method described above, and may be used to develop additional improved methods discussed below. TF-IDF does not have these properties. One embodiment of a method for calculating IDF similarity measure is referred to herein as the improved No Random Access (iNRA) method. High-level pseudocode for the iNRA method is shown in FIG. 5. Given FIG. 5 and the accompanying description herein, one skilled in the art would be able to implement the method shown in FIG. 5. For example, one skilled in the art would be able to implement the method using appropriate computer program instructions. In (L502), the lists q={$q^1, \ldots, q^n$} and the threshold r are provided as input. The desired output, shown in (L504), are the sets s whose IDF similarity score $\mathcal{I}(q, s)$ is $\geq \tau$. In (L506), the candidate list C is initially set to null, C=∅, and $f_i$ is initialized to the first element in list i. In (L508), the following initial values are set: ∀ new s∈C, let $\mathcal{I}^+(s)=0$; $\mathcal{I}^+(s)=0$; $b_{[1,n]}(s)=0$. Given query q and threshold $\tau$, length boundedness may be used to determine which part of the lists need to be scanned. If no index on lengths exists, the NRA method is followed, and list entries outside the length bounds are ignored during sequential scans. If an index on length exists (for example, in the form of a skip list), then, in (L510), the iNRA method skips directly to the first entry with length greater than $\tau$ len(q) in every list. In (L512), the pseudocode instructs the steps shown in (L514)-(L534) to be repeated until the stopping condition in (L536), C=∅, is satisfied. In the iNRA method, the step shown in (L519) is not included (see discussion of hybrid method below). In (L514), the pseudocode instructs the steps shown in (L516)-(L524) to be iterated for all $1 \leq i \leq n$. Reading a list is stopped after encountering the last element with length equal to len(q)/$\tau$(L518).

Order preservation is used to directly determine if a given element appears in a list or not. Given set s, if len(s)<len($f_i$) for any i, and s has not appeared in list i yet, its upper bound is updated accordingly. Set s will never appear in list i. Magnitude boundedness may be used to directly compute the best case upper bound for any encountered set id. If the upper bound is less than $\tau$, the set may be immediately discarded. This computation requires time linear to the number of lists per element access. To reduce the overhead, the following pre-condition may be used. The frontier elements $f_i$ define a conceptual best possible score of a yet unseen element. Assume that the same set id appears in all lists exactly after elements $f_i$. The score of this unseen element is at most $$\mathcal{F} = \sum_{1 \leq i \leq n} w_i(f_i).$$

In (L256), the pseudocode instructs the steps shown in (L528)-(L534) to be iterated for all r∈C. If $\mathcal{F}<\tau$, no unseen element can exceed the threshold. Hence, after this condition is satisfied, no new elements need to be inserted in the candidate set. Only the scores of already discovered elements need to be completed. Threshold $\mathcal{F}$ is computed only once per round robin iteration. Also, the NRA method performs one scan of the candidate set per round robin iteration. If the candidate set is large, the cost is very large. Note that iNRA method cannot terminate unless $\mathcal{F}<\tau$. Hence, scanning the candidate set before this condition is satisfied is not necessary. Also, a conservative approach for reducing the scanning cost is to terminate the scan once the first viable candidate has been encountered (that is, a candidate with $\mathcal{I}^+(s) \geq \tau$). Based on the order preservation property of the iNRA method, in the worst case, the NRA method reads arbitrarily more elements than the iNRA method. Additionally, any method that utilizes the length boundedness property runs arbitrarily better than the NRA method for certain instances. The above embodiments have been discussed with respect to improving the NRA method. One skilled in the art may use the additional IDF properties (order preservation, magnitude boundedness, and length boundedness) to develop embodiments which improve standard TA methods to yield an improved TA method, referred to herein as iTA.

One embodiment of a method for calculating IDF similarity measure is referred to herein as the shortest-first (SF) method. The iNRA method discussed above uses the properties of IDF to speed-up the search but adheres to the round-robin processing of lists in the original NRA method. In that sense, the NRA method can be viewed as a breadth-first approach. A different strategy is a depth-first approach. The SF method scans lists in decreasing idf order. By the definition of idf, frequent tokens (with low idf) are associated with long lists and rare tokens (with high idf) are associated with short lists. By reading shorter lists first, the search discovers a smaller number of false positive candidates, improving pruning bounds faster, and, hence, obviating the need to exhaustively scan longer lists. High-level pseudocode for the SF method is shown in FIG. 6. Given FIG. 6 and the accompanying description herein, one skilled in the art would be able to implement the method shown in FIG. 6. For example, one skilled in the art would be able to implement the method using appropriate computer program instructions. In (L602), the lists q={$q^1, \ldots, q^n$} and the threshold value $\tau$ are provided as input. The desired output, shown in (L604), are the sets s whose IDF similarity score $\mathcal{I}(q, s)$ is $\geq \tau$. Let query q= {$q^1, \ldots, q^n$} and, without loss of generality assume that (L606) idf($q^1$)>idf($q^2$)> . . . , idf($q^n$). In (L608) the candidate list C is initially set to null, C=∅, and max len(C)=0. In (L610), the pseudocode instructs the steps shown in (L612)-(L628) to be iterated for all $1 \leq i \leq n$. Denote by $\lambda_i$ the maximum length a candidate s in list $q^i$ can have, such that $\mathcal{I}(q, s)$ is $\geq \tau$, assuming that s appears in all subsequent lists $j \geq i$ (since the length of s is constant across all lists). Hence, $$\sum_{i \leq j \leq n} \frac{idf(q^j)^2}{\lambda_i len(q)} \geq \tau \Rightarrow \lambda_i \leq \sum_{i \leq j \leq n} \frac{idf(q^j)^2}{\tau len(q)} \qquad (E7)$$

Length $\lambda_i$ is a natural cutoff point in list i beyond which no yet unseen element s can be a viable candidate. Also note that $\lambda_1 \geq \lambda_2 \geq \ldots \geq \lambda_n$.

The SF method proceeds as follows. In (L612), it skips to the first entry in every list with length len(s)$\geq \tau$len(q). Then, in (L614) it computes $\lambda_1, \ldots, n$. It then scans lists from high idf to low idf order, reading all elements from length $\tau$len(q) up to and including sets with length min($\lambda_i$,len(q)/$\tau$) (L616). Potential candidates are stored in a sorted list C in increasing length order. In (L618), the pseudocode calls for the steps shown in (L620)-(L626) to be repeated until the stopping condition in (L628) is satisfied, len(s)>max(max len(C),$\mu_i$). When scanning list $q^1$, C is initially empty and it is populated with all new elements from $q^1$. Note that any element with length larger than $\lambda_1$ cannot exceed the threshold, even if it appeared at the top of every subsequent list. When scanning $q^2$, since both C and $q^2$ are sorted by increasing lengths, a merge-sort method is performed to combine the new elements read with the existing list. The partial score of elements in C contributed from list $q^1$ is updated; new elements from list $q^2$ are inserted in C in sorted length order; elements contributed by previous lists not present in the current list are re-evaluated for potential pruning (for example, sets from list $q^1$ that did not appear in list $q^2$, and thus have smaller potential maximum score than initially computed). Once again, new elements with length larger than $\lambda_2$ cannot exceed $\tau$. But there may be elements s from list $q^1$ with $len(s) > \lambda_2$ already in C. Hence, to guarantee that no partial score components of elements in C have been omitted, the SF method continues to scan list $q^2$ until it encounters an element with length larger then the largest length in C (denoted by max len(C)). Pruning non-viable candidates is important since it reduces max len (C) and, consequently, affects how deep the method needs to scan subsequent lists. The process continues sequentially with all remaining lists. It terminates when the score of all elements in C is complete (L628).

Comparing the iNRA method to the SF method, in some instances the SF method reads fewer entries than iNRA (worst case). In other instances, the SF method reads arbitrarily more elements than the iNRA method (worst case). Choosing to access longer, low idf lists last has important advantages. In practice, it is expected that only a small fraction of long lists will need to be accessed, since max len(C) and $\lambda_i$ keep decreasing as the process proceeds. Another advantage is that the SF method requires only one scan of the candidate set per list, in contrast with iNRA method, which requires one scan for each round-robin iteration. The bookkeeping cost of the SF method will be significantly smaller than that of the iNRA method. A hybrid approach that combines the small input/output (I/O) cost of both methods for all problem instances would be advantageous.

One embodiment of a method for calculating IDF similarity measure is referred to herein as the hybrid method. The SF method has very small bookkeeping cost due to its sorted data structure and is expected to achieve high element pruning on average. On the other hand, the iNRA method has significantly higher bookkeeping cost due to the required candidate set scans, but may access arbitrarily fewer elements than the SF method in special cases. A method that accesses the least possible number of elements would be advantageous. The hybrid method reads elements in a round-robin fashion like the iNRA method but uses max len(C) as a stopping condition for a particular list. This condition restricts the hybrid method from descending in any list deeper than the SF method, hence making the hybrid method at least as efficient as the SF method in terms of element accesses for all instances. In addition, since the hybrid method follows the iNRA strategy, it reads no more elements than the iNRA method in all cases, combining advantageous features of both previous methods. Therefore, the hybrid method reads at most as many elements as either the SF method or the iNRA method for all problem instances.

The hybrid method follows similar high-level pseudocode as shown in FIG. 5. The max len(C) condition, however, is added in (L519). In the present form, the hybrid method has higher bookkeeping cost than either the iNRA method or the SF method, since it needs to maintain C as a hash table on string id's for efficient access. It also needs to identify the current max len(C) per list access, which necessitates a full scan of C. Note that max len(C) cannot be maintained incrementally, since elements are deleted occasionally from the set.

A special candidate set organization may reduce both the cost of scanning C and identifying max len(C). Candidates are partitioned into lists sorted by length; one sorted list $c_i$ per inverted list $q^i$ along with a hash table on string id's. A candidate s first discovered in $q^i$ is inserted into candidate list $c_i$. Since candidates from $q^i$ are discovered in increasing length order by construction, they can simply be appended to the end of $c_i$ for a constant insertion cost. Each candidate is also inserted in the hash table, along with a pointer to its location in list $c_i$, needed for efficient deletion when elements are pruned from the hash table. With this combined structure, max len(C) may be computed by peeking at the last element of every list, for a cost linear to n (as opposed to linear to the number of candidates). Moreover, deleting all non-viable candidates from the candidate set is accomplished by dropping elements repeatedly from the back of all lists until a viable candidate is found in every list (once a viable candidate is found, all subsequent elements are guaranteed to be viable as well). The same structure can be used with the iNRA method in order to minimize memory requirements by removing all non-viable candidates after a scan, instead of terminating the scan once the first viable candidate is found.

Figure 7:
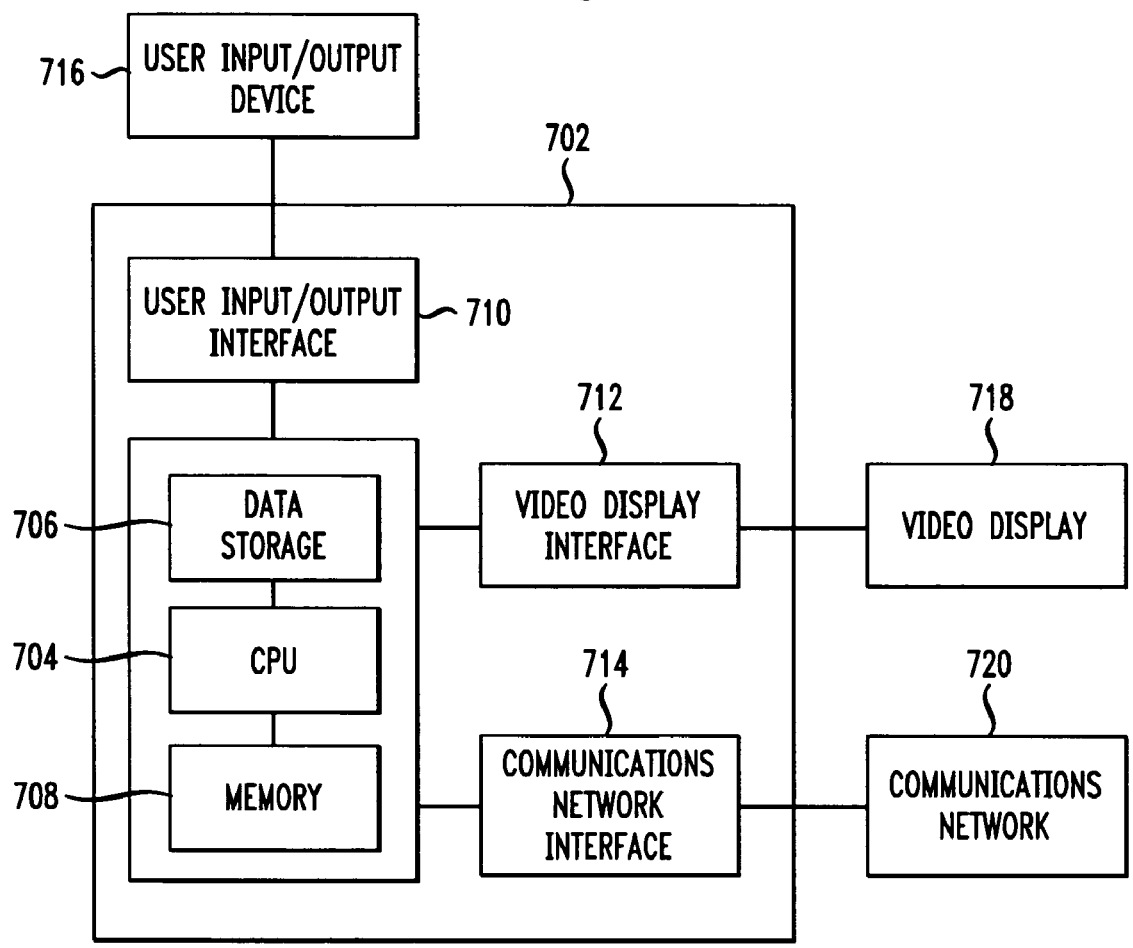
FIG. 7 shows a computer which may be used as a set similarity processor.

One embodiment of a set similarity processor (for example, set similarity processor 142 in FIG. 1) may be implemented using a computer. The steps shown in the flowcharts in FIGS. 2 and 4-6 may be implemented using a computer. As shown in FIG. 7, computer 702 may be any type of well-known computer comprising a central processing unit (CPU) 704, memory 708, data storage 706, and user input/output interface 710. Data storage 706 may comprise a hard drive or non-volatile memory or at least one tangible, persistent, non-transitory computer readable medium. User input/output interface 710 may comprise a connection to a user input device 716, such as a keyboard or mouse. As is well known, a computer operates under control of computer software which defines the overall operation of the computer and applications. CPU 704 controls the overall operation of the computer and applications by executing computer program instructions which define the overall operation and applications. The computer program instructions may be stored in data storage 706 and loaded into memory 708 when execution of the program instructions is desired. Computer 702 may further comprise a video display interface 712, which may transform signals from CPU 704 to signals which may drive video display 718. Computer 702 may further comprise one or more network interfaces. For example, communications network interface 714 may comprise a connection to an Internet Protocol (IP) communications network 720, which may transport user traffic, such as query set 102 and database set 1 106, in FIG. 1. Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for calculating a similarity score of a query set comprising a query set of tokens and a first database set comprising a first database set of tokens, wherein the first database set is one of a plurality of database sets in a data collection set stored on a non-transitory computer readable medium, comprising the steps of:

for each specific token in the query set, determining the number of database sets that contain the specific token;

for each specific token in the query set, calculating an inverse document frequency (idf) weight, based at least in part on the number of database sets that contain the specific token and on the total number of database sets in the data collection set;

calculating a normalized length of the first database set;

calculating a normalized length of the query set; and, calculating a similarity score based at least in part on the normalized length of the first database set, the normalized length of the query set, and the idf weight of each of the tokens in the query set.

2. The method of claim 1 further comprising the step of performing an improved no random access method.

3. The method of claim 1 further comprising the step of performing a shortest-first method.

4. The method of claim 1 further comprising the step of performing a hybrid method.

5. The method of claim 1 further comprising the step of determining that the first database set contains information relevant to the query set by performing the steps of:

defining a threshold value;

comparing the similarity score to the threshold value; and, determining that the first database set contains relevant information if the similarity score is greater than or equal to the threshold value.

6. The method of claim 1 further comprising the step of calculating the idf weight of a specific token according to the formula:

$$idf(q^i) = \log_2(1 + N/N(q^i))$$

wherein:

$q^i$ represents the specific token;

$idf(q^i)$ represents the idf weight of the specific token;

N represents the total number of database sets in the data collection set; and, $N(q^i)$ represents the number of database sets that contain the token $q^i$.

7. The method of claim 6 further comprising the step of calculating the normalized length of the first database set according to the formula:

$$len(s) = \sqrt{\sum_{s^i \in s} idf(s^i)^2}$$

wherein:

s represents the first database set;

len(s) represents the normalized length of the first database set; and, $s^i$ represents a specific token in s.

8. The method of claim 7 further comprising the step of calculating the normalized length of the query set according to the formula:

$$len(q) = \sqrt{\sum_{q^i \in q} idf(q^i)^2}$$

wherein:

q represents the query set;

len(q) represents the normalized length of the query set; and, $q^i$ represents a specific token in q.

9. The method of claim 8 further comprising the step of calculating the similarity score of s and q according to the formula:

$$\mathcal{I}(q, s) = \sum_{s^i \in q \cap s} \frac{idf(s^i)^2}{len(s)len(q)}$$

wherein $\mathcal{I}(q, s)$ is the similarity score of s and q.

10. An apparatus for calculating a similarity score of a query set comprising a query set of tokens and a first database set comprising a first database set of tokens, wherein the first database set is one of a plurality of database sets in a data collection set, comprising:

means for determining for each specific token in the query set the number of database sets in the data collection set that contain the specific token;

means for calculating an inverse document frequency (idf) weight for each specific token in the query set, based at least in part on the number of database sets that contain the specific token and on the total number of database sets in the data collection set;

means for calculating a normalized length of the first database set;

means for calculating a normalized length of the query set; and, means for calculating a similarity score based at least in part on the normalized length of the first database set, the normalized length of the query set, and the idf weight of each of the tokens in the query set.

11. The apparatus of claim 10 further comprising means for processing an improved no random access process.

12. The apparatus of claim 10 further comprising means for processing a shortest-first process.

13. The apparatus of claim 10 further comprising means for processing a hybrid process.

14. The apparatus of claim 10 further comprising means for determining that the first database set contains information relevant to the query set, comprising:

means for defining a threshold value;

means for comparing the similarity score to the threshold value; and, means for determining that the first database contains relevant information if the similarity score is greater than or equal to the threshold value.

15. A non-transitory computer readable medium storing computer program instructions for calculating a similarity score of a query set comprising a query set of tokens and a first database set comprising a first database set of tokens, wherein the first database set is one of a plurality of database sets in a data collection set, said computer program instructions defining the steps of:

for each specific token in the query set, determining the number of database sets in the data collection set that contain the specific token;

for each specific token in the query set, calculating an inverse document frequency (idf) weight based at least in part on the number of database sets that contain the specific token and on the total number of database sets in the data collection set;

calculating a normalized length of the first database set;

calculating a normalized length of the query set; and, calculating a similarity score based at least in part on the normalized length of the first database set, the normalized length of the query set, and the idf weight of each of the tokens in the query set.

16. The non-transitory computer readable medium of claim 15 wherein said computer program instructions further comprise computer program instructions defining the step of:
performing an improved no random access process.

17. The non-transitory computer readable medium of claim 15 wherein said computer program instructions further comprise computer program instructions defining the step of:
performing a shortest-first process.

18. The non-transitory computer readable medium of claim 15 wherein said computer program instructions further comprise computer program instructions defining the step of:
performing a hybrid process.

19. The non-transitory computer readable medium of claim 15 wherein said computer program instructions further comprise computer program instructions defining the step of calculating the idf weight of a specific token according to the formula:

$$idf(q^i) = \log_2(1 + N/N(q^i))$$

wherein:
$q^i$ represents the specific token;
$idf(q^i)$ represents the idf weight of the specific token;
N represents the total number of database sets in the data collection set; and,
$N(q^i)$ represents the number of database sets that contain the token $q^i$.

20. The non-transitory computer readable medium of claim 19 wherein said computer program instructions further comprise computer program instructions defining the step of calculating the normalized length of the database set according to the formula:

$$len(s) = \sqrt{\sum_{s^i \in s} idf(s^i)^2}$$

wherein:
s represents the database set;
len(s) represents the normalized length of the database set; and,
$s^i$ represents a specific token in s.

21. The non-transitory computer readable medium of claim 20 wherein said computer program instructions further comprise computer program instructions defining the step of calculating the normalized length of the query set according to the formula:

$$len(q) = \sqrt{\sum_{q^i \in q} idf(q^i)^2}$$

wherein:
q represents the query set;
len(q) represents the normalized length of the query set; and,
$q^i$ represents a specific token in q.

22. The non-transitory computer readable medium of claim 21 wherein said computer program instructions further comprise computer program instructions defining the step of calculating the similarity score according to the formula:

$$\mathcal{I}(q, s) = \sum_{s^i \in q \cap s} \frac{idf(s^i)^2}{len(s)len(q)}$$

wherein $\mathcal{I}(q, s)$ is the similarity score of s and q.

23. The non-transitory computer readable medium of claim 15, wherein said computer program instructions further comprise computer program instructions defining the step of determining that the first database set contains information relevant to the query set by performing the steps of:
defining a threshold value;
comparing the similarity score to the threshold value; and,
determining that the first database set contains relevant information if the similarity score is greater than or equal to the threshold value.

* * * * *